May 4, 1965 L. G. BOONE 3,182,230
SWITCHING DEVICE
Filed April 13, 1959 3 Sheets-Sheet 1

INVENTOR
LEWIS G. BOONE
BY
ATTORNEY

May 4, 1965  L. G. BOONE  3,182,230
SWITCHING DEVICE
Filed April 13, 1959  3 Sheets-Sheet 3
FIG. 3
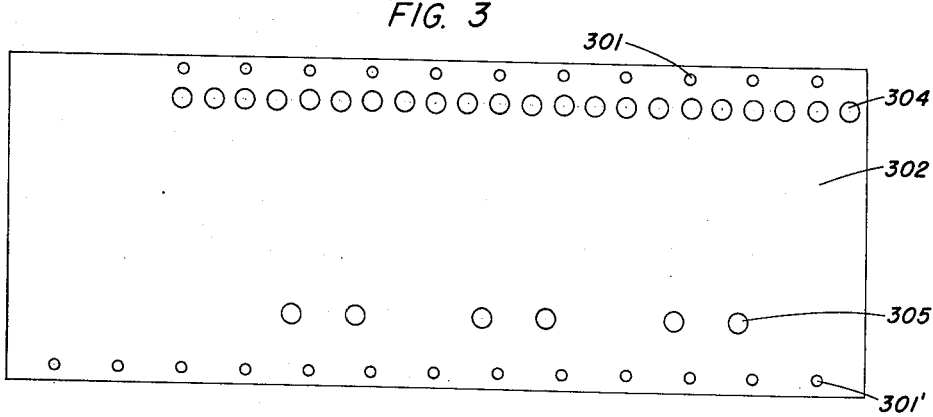
FIG. 4
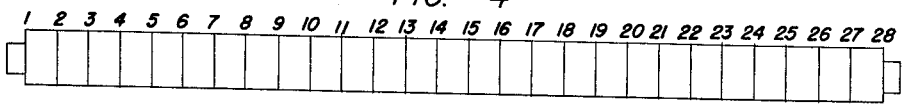
FIG. 5
| STROKE NO. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|---|---|---|---|---|---|---|---|---|---|---|---|---|
| TOP ROW | | | | | | X | | X | | X | | X | | X | | X | | X | | X | | X | | X | | X | | |
| 2nd ROW | | | | | | X | X | X | X | X | X | X | X | X | X | X | X | X | X | X | X | X | X | X | X | X | X | |
| 3rd ROW | | | | | | | X | X | | | X | X | | | X | X | | | X | X | | | | | | | | |
| BOTTOM ROW | | X | | X | | X | | X | | X | | X | | X | | X | | X | | X | | X | | X | | X | | |
| CUT OFF | X | | | | | | | | | | | | | | | | | | | | | | | | | | | X |
INVENTOR
LEWIS G. BOONE
BY
ATTORNEY

United States Patent Office 3,182,230
Patented May 4, 1965

3,182,230
SWITCHING DEVICE
Lewis G. Boone, 311 Norris Court, Madison, Wis.
Filed Apr. 13, 1959, Ser. No. 805,986
11 Claims. (Cl. 317—137)

This invention relates to electro-mechanical servo-mechanisms and more particularly to a control mechanism in which is contained as one component an automatic rotary stepping electrical switch and as another component a manually operated electrical switch panel.

Automatic control of switching operations has been widely exploited in commercial installations, particularly in automating communication facilities and manufacturing operations. The need for switching devices which are both reliable in operation and flexible in application is clearly present in industries which utilize repetitive sequences of switching operations and in which rearrangement of switching sequences is often necessary.

The device of this invention incorporates as a principal element a rotary stepping switch. The arrangement of circuits and switches in the device of the invention enable random selections to be made from a plurality of circuits that interconnect with the rotary switch by use of manually operated switching panels. The circuits that are disconnected from the rotary switch are automatically by-passed by the moving contact of the rotary switch, the by-passing operation being accomplished by self interrupted operation of the rotary switch and with extreme rapidity of movement of the moving contact of the rotary switch.

The operational impulse which is necessary to actuate the rotary switch circuit can be an impulse of short duration which is recurrent at very short time intervals. The maximum possible rate of repetitive response is governed only by the mass inertia and frictional forces which may be present in the system.

In many circuit control applications it is desirable to be able to quickly and simply re-circuit the operations controlled. The device of this invention provides flexibility of operation in control circuit applications without impairing operational continuity of the system.

It is an object of this invention to provide a switching device which enables circuits to be selectively and instantly introduced into or removed from the control of an operational circuit.

It is a further object to provide a rapid operating selectively indexing switching device in which control circuit interconnections can be altered quickly and expediently without interrupting the continuity of control.

Other objects will become apparent from the drawings and from the following detailed description in which it is intended to illustrate the applicability of the invention without thereby limiting its scope to less than that of all equivalents which will be apparent to one skilled in the art. In the drawings like reference numerals refer to like parts and:

FIGURE 3 is a plan view of a die stamped article of manufacture which can be made by punch presses controlled by the device of the invention.

FIGURE 4 is a schematic drawing of the sequence of positions assumed of the article of FIGURE 2 in a punch press.

FIGURE 5 is a programming chart of the operation controlling a press used to manufacture the article of FIGURE 3.

Figure 1:
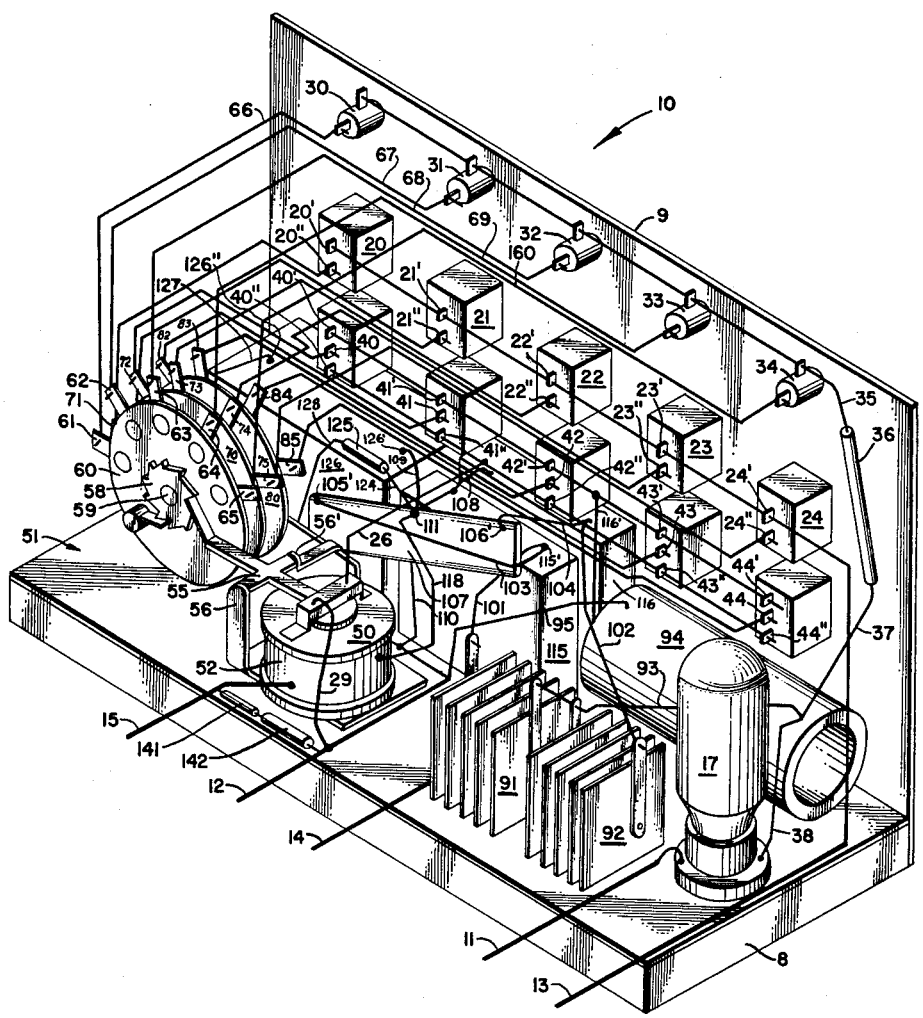
FIGURE 1 is an isometric view of the invention.

In FIGURE 1 supporting base 8 and back member 9 provide a mounting structure for device 10. Power supply lead wire 11 connects device 10 to a 110 volt A.C. supply facility (not shown) through circuit regulating lamp 17. Ground wire 12 provides electrical ground for device 10. Connecting conductor 13 connects to terminals 20', 21', 22', 23', and 24' of second level switches 20, 21, 22, 23, and 24. The second level switch connections are shown as schematic representations of conventional two position toggles, one position being an open circuit position. Conductor 14 connects to terminals 40', 41', 42', 43', and 44' of first level switches 40, 41, 42, 43, and 44. The first level switches are also shown schematically and represent conventional three position toggles, the center position being the open circuit position. Connecting conductor 15 connects an operational switch (not shown) to the winding 52 of electromagnet 50 contained in rotary stepping switch 51. Stepping switch 51 is of conventional direct current self-interrupted design and is incorporated into device 10 as one element thereof. Connecting conductor 15 enables current to flow through winding 52 of solenoid 50 thereby to create a magnetic field which can actuate lever member 55 to move downwardly toward solenoid 50. Lever 55 is thereby caused to pivot in mountings 56 and 56' so as to index rachet 58 of rotary switch 51 in a counterclockwise direction as viewed in FIGURE 1. Disc 60, disc 70, and disc 80 and rachet 58 of rotary switch 51 are fixedly attached to shaft 59 and undergo movement together as a unit. Terminal contacts 61, 71, and 81 of discs 60, 70, and 80 respectively are mutually interconnected by circuitry within rotary switch 60 as are other terminals of corresponding positions on multiple disc rotary switch 51, such as terminals 62, 72, and 82, etc. Terminals 61, 62, 63, 64, and 65 of disc 60 make sliding contact with conductors 66, 67, 68, 69, and 160. Terminals 71, 72, 73, 74 and 75 of disc 70 make sliding contact with conductors connecting to second level switches. Terminals 81, 82, 83, 84 and 85 of disc 80 make sliding contact with conductors connecting the first level switches. Conductors 66, 67, 68, 69 and 160 are affixed to neon lamps 30, 31, 32, 33 and 34 respectively. Conductor 35 connects neon lamps 30, 31, 32, 33 and 34 to power supply facilities through capacitance 36, conductor 37, conductor 38, lamp 17 and power supply lead wire 11. Any or all of switches 20, 21, 22, 23, and 24 can be connected into contact with corresponding terminals 20', 21', 22', 23' and 24' by placing toggles (not shown) in closed positions. The circuits are thereby closed through connection with conductor 13 which in turn connects to a second level control signal solenoid (not shown) and thence to ground.

The switches are closed by means of elevating any or all toggles (not shown) of the first switching level into contact with any or all of terminals 40', 41', 42', 43' and 44', respectively, which are in turn connected to conductor 14. The circuit can also be closed by depressing any or all toggles (not shown) of the first switching level into contact with any or all terminals 40", 41", 42", 43" and 44", respectively, which are connected to ground wire 12 by connection through connector 26, lever 55 and conductor 29.

Supply power for device 10 is single phase alternating current. It is necessary to rectify the current from alternating to direct to furnish power to automatic stopping switch 51. This is accomplished by the provision of selenium rectifiers 91 and 92 connected in parallel by conductor 93, conductor 38 and regulator 17 to power supply lead wire 11. Conductor 38 also connects resistor 94 into the alternating current circuit, and conductor 95 connects resistor 94 to ground wire 12 thereby creating a parallel current path in resistor 94 relative to all other combined circuit elements of device 10.

Conductor 101 connects rectifier 91 to terminal 115' of capacitance 115, and conductor 102 connects rectifier 92 to terminal 116' of capacitance 116, capacitances 115 and 116 being housed and sharing common terminal 108 wherefrom conductor 110 connects to ground wire 12.

Conductor 103 connects from terminal 115' to terminal 105' and conductor 104 connects from terminal 116' to terminal 106' of resistor 107. Resistor 107 is a center tap resistor and incorporates two separate resistors (resistor 105 and 106 of FIGURE 2).

From center tap terminal 111 of resistor 107 conductor 109 connects to terminal 126' of housed capacitance 126. From terminal 126" conductor 127 connects to ground wire 12. From center tap terminal 111 conductor 124 connects to resistor 125. Conductor 128 connects resistor 125 to ground wire 12. From center tap terminal 111 conductor 118 connects to winding 52 of electromagnet 50. Conductor 15 connects winding 52 to power supply through an operational switch (not shown). Resistor 141 and capacitance 142, connect conductor 15 to ground wire 12.

Figure 2:
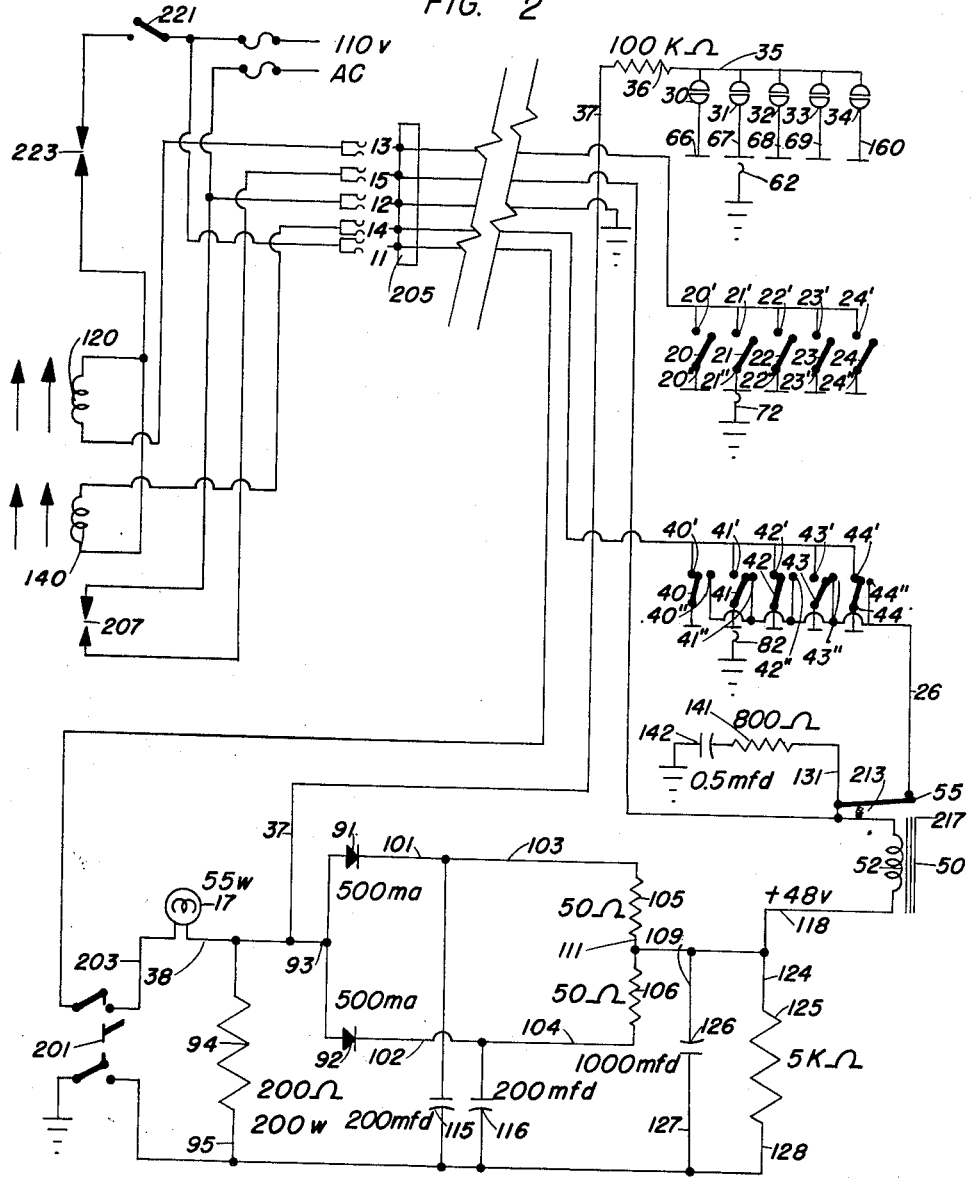
FIGURE 2 is a schematic circuit diagram of the invention.

In FIGURE 2 a schematic diagram of the device of FIGURE 1 together with terminal facilities and operational switches and response solenoids are shown. Power is supplied to the operational circuit containing electromagnet 50 of a rotary switch from 110 volt A.C. supply source power supply lead wire thence through knife switch 201, conductor 203 and 55 watt regulating lamp 17. Lamp 17 offers increasing resistance in the circuit with increasing current flow therethrough thereby to heat to progressively elevated temperature thus providing variable resistance and current overload protection to the circuit.

Conductor 38 connects to resistor 94 of 200 ohm, 200 watt characteristics. Conductor 95 connects resistor 94 to ground.

Conductor 37 connects conductor 38 to 100 kilo ohm resistor 36. Conductor 35 connects resistor 36 to control circuit indicating neon lamps 30, 31, 32, 33 and 34.

Conductor 93 connects conductor 38 to parallel connected 500 milli-amp selenium rectifiers 91 and 92. Conductor 101 connects rectifier 91 to 200 micro-farad capacitance 115. Both capacitances 115 and 116 are connected to ground.

Conductor 103 connects conductor 101 to 50 ohm resistor 105 and conductor 104 connects through conductor 102 to 50 ohm resistor 106. Conductor 109 connects resistors 105 and 106 through center tap terminal 111 to 1000 micro-farad capacitance 126. Conductor 127 connects capacitance 126 to ground. Conductor 124 connects center tap terminal 111 to 5 kilo ohm resistor 125. Conductor 128 connects resistor 125 to ground.

Conductor 118 conducts 48 volt rectified current from overload protecting and current rectifying facilities with connection being made at terminal 111 to winding 52 of electro-magnet 50 of a self interrupted operation rotary stepping switch of conventional design. Conductor 15 connects winding 52 of electromagnet 50 through terminal box 205 to downstroke microswitch 207. Switch 207 is connected to ground. Connection is made to conductor 15 by conductor 131 and thence to 800 ohm resistor 141 and 0.5 microfarad capacitance 142 in series therewith to ground. Connection is also made through lever 55 to conductor 26.

When downstroke microswitch 207 is closed electro-magnet 50 is caused to attract pivoted ferromagnetic lever 55 into close adjacency thereto thereby to open the circuit at the junction of lever 55 and conductor 26. Electro-magnet 50 attracts lever 55, while current flows in the circuit of winding 52. Spring 213 returns lever 55 to closed circuit position when magnetic flux in electro-magnet 50 is substantially constant, thereby to contact conductor 26, and cause, through mechanical linkage, finder switches 62, 72 and 82 to index together to next adjacent terminals, i.e. one position to the left as shown, thus to move finder switch to switch 40, etc. Indexing occurs whenever input signal microswitch 207 is closed and continues so long as first level automatic indexing circuit through lever 55 and conductor 26 is grounded. The number of indexing operations is a function of time only and is not a function of the number of closures that may be made by swich 207. When ground connection is made only through conductor 15 and microswitch 207 the number of indexing operations is a function only of the number of closures made by switch 207. Indexing is a function of the settings of the first level switches, when rotary stepping switch 51 is undergoing self-interrupted operation as occurs when current passes through lever 55 and the first switching level to ground.

Power is supplied through switch 221 to repetitive index controlling microswitch 223 thence to parallel wired solenoids 120 and 140. Solenoid 120 is an output response mechanism and is connected by conductor 13 to terminals 20', 21', 22', 23' and 24' of second level switches. All of toggles 20, 21, 22, 23 and 24 are shown in open circuit position thereby preventing the second level control circuit from being closed at any position of rotating finder switch 72 and thence to ground thereby to actuate second level output response solenoid 120.

In the first level control circuit solenoid 140 will be actuated when current flows in conductor 14 through terminal and cable facilities to first level switch terminals 40', 41', 42', 43' and 44' thence through any switch in contact with any of said terminals and with finder switch 82. If switch 41 were contacting terminal 41' in FIGURE 2, it would enable current to flow through finder switch 82 to ground, thereby to close the first level control circuit and actuate first level output response solenoid 125.

The first level circuit switch 41 as shown in FIGURE 2 is in "skip" position. Current will flow through conductor 26 to terminal contacts 40", 41", 42", 43" and 44". From contact 41" current will flow through switch 41 and finder switch 82 to ground, thereby closing the first level control circuit and actuating solenoid 52. Lever 55 will index and advance finder switch 82 stepwise for such time as finder switch 82 may continue to contact charged first level automatic indexing switches. When a first level automatic indexing terminal is contacted which is not charged lever 55 will remain in contact with conductor 26 and indexing of finder switches 62, 72, and 82 will cease. When downstroke microswitch 207 is again closed the operational circuit will be closed and finder switches 62, 72, and 82 will index.

The third level contains neon lights 30, 31, 32, 33 and 34. The lights can be illuminated to indicate the circuits with which finder switches 62, 72 and 82 are in contact.

The first and second switching levels enable a plurality at circuits to be either introduced into the control of the operational circuit or removed from the control of the operational circuit. By setting one or more switch toggles of the first switching level into contact with the first level control circuit (single primed terminals) the first level solenoid will operate when finder switch 82 grounds a charged first level switch. When a first level toggle is positioned into contact with the automatic indexing circuit (double primed terminals) the rotary switch will index auotmatically advancing to the left in FIGURE 2 finder switches 62, 72 and 82 to the next adjacent station.

The second level finder switch 72 when brought into contact with a closed control circuit switch grounds the second level control circuit thereby to actuate second level solenoid 120.

Repetitive index controlling microswitch 223 is provided in the control circuits to prevent arcing across the contacts of the control circuits when input signal microswitch 207 is closed. Microswitch 223 is closed after microswitch 207 is closed. Both switches are actuated by input signals fed into the operational circuit.

The invention as illustrated in FIGURES 1 and 2 discloses two switching levels. It is to be understood that the device of the invention can also be constructed to operate using only the first switching level or can be constructed to operate using a larger plurality of switching levels, the only requirement being that at least one finder switch of automatic switch 51 contact each switching level.

It is also possible to connect a plurality of the disclosed devices into one operational circuit. Tandem connection of a plurality of devices can be made by parallel connection between an input microswitch and a repetitive index controlling microswitch and thereby enable finder switches at each switching level to be mutually independent in operation and provide automatic indexing mechanisms of each switching level to be mutually independent in operation.

The devices of this invention can also be connected into an operating circuit in multipled arrangement. Each device other than an initial one in circuit is enabled to receive an operational impulse which is the output impulse of a switching level in the device which precedes it in the circuit. Combinations of tandem and multiple arrangements can also be connected in one operational circuit.

In FIGURE 3 is shown a metal panel stamping which can be manufactured either by a single die stamping which can be manufactured either by a single die press machine with four independently activated dies or by three die press machines in consecutive arrangement, each machine having a single die. Attaching screw holes 301 and 301′ are uniformly spaced along the top and the bottom extremities of the panel 302 respectively. Conduit openings 304 are spaced uniformly at equal intervals in panel 302 and tie rod holes 305 are disposed in irregular intervals in panel 302. All center to center dimensions of each series of punched holes are integral multiples of the distance at each indexing step that the panel makes by means of being advanced by an automatic transfer assembly.

FIGURE 4 shows panel 302 of FIGURE 3 marked with progressively numbered die coordinating positions according to the position that panel 302 would take in a die press at successive indexing intervals. After position 28 the cycle is repeated with a next following metal blank. The arrangement shown assumes only that the rotary switch control of the operation controlling device of this invention has at least 28 consecutive positions in one cycle and that the distance of each advancing movement of the metal blank is equal to or a multiple of the least common denominator of the various series of punch operation center-to-center distances.

FIGURE 5 shows a programming chart for the operation that would be necessary to manufacture panel 302. The device necessary to control the circuit would need four switching levels, each level being set in skip position in conformance with each blank space in the programming chart.

While certain modifications and embodiments of the invention have been described, it is of course to be understood that there are a great number of variations which will suggest themselves to anyone familiar with the subject matter thereof and it is to be distinctly understood that this invention should not be limited except by such limitations as are clearly imposed in the appended claims.

I claim:

1. An electrical switching device of the type described comprising a selector circuit, a shunt circuit, a control circuit, and an electric power supply common to all circuits, said selector circuit connecting from said power supply through input signal receiving means, thence through winding means on an automatic stepping switch, hence through a magnetizable movable armature of said stepping switch, thence to first bank of closable terminals of at least one multiple closable position selector switch thence through the throw of each said switches to grounding terminals of said selector switches which contact with a stepwise moving contact on said automatic stepping switch, said moving contact being electrically grounded, said shunt circuit connecting across said selector circuit between said electromagnet winding and said electrical ground, said control circuit connecting from said power supply through output signal delivering means, thence through second selectively closable terminals of said selector switches, thence through said throw of each said switch into contact with said stepwise moving contact of said automatic stepping switch, each of said selector switches having multiple closed circuit positions with ground connection being made by having grounding terminals of said switches being contacted individually and sequentially by a stepwise moving contact on said automatic stepping switch.

2. A device as in claim 1 wherein said input signal receiving means and said output signal delivering means are solenoids.

3. A device as in claim 1 wherein said electrical ground is a second wire of a multi-wire power supply distributing system.

4. A device as in claim 1 wherein said output signal delivering means is a solenoid and a circuit opening switch.

5. An electrical switching device of the type described comprising an impulse operated rotary stepping switch externally operated switches, each of said externally operated switches connected to one of a plurality of contacts of said stepping switch, one terminal of each of said externally operated switches wired for self interrupted operation through electrical connection between an electromagnetically actuated armature of said stepping switch, an electrical ground to interconnectible terminals of said externally operated switches.

6. An electrical switching device of the type described comprising at least one rotary stepping switch connected for both impulse controlled operation and self interrupted operation, said self interrupted operating circuit portions including therein interconnectable terminals of at least one multi-closed postion switch, each said multi-position switch being connected to one of a plurality of contacts of said stepping switch, said device having impulse actuation means and impulse delivering means.

7. An electrical switching device of the type described comprising at least one rotary stepping switch connected for both impulse controlled operation and self interrupted operation, said self interrupted operating circuit portions including therein interconnectable terminals of at least one multi-closed position switch, each said multi-position switch being connected to one of a plurality of contacts of said stepping switch, and single terminals of at least one switch having at least a singular closed position.

8. In electrical switching devices, the combination of at least one rotary stepping switch, a plurality of first externally operated multiple closable position switches, each of said first externally operated switches connecting one of a plurality of closable terminals thereof to one of the closable contacts of said stepping switch, each said closable terminal being connectable to one of a plurality of selective circuits, one of said selective circuits providing self-interrupted operation of said stepping switch, another of said selective circuits providing remote operation of said stepping switch, solenoid response means remote from said stepping switch in said selective circuit for providing remote control for external machine operation.

9. The device of claim 8 wherein a plurality of second externally operated switches is provided, each of second externally operated switches connecting one of a plurality of contacts of a second bank of said stepping switch to at least one circuit having electrically actuated means therein.

10. The device of claim 9 wherein said circuit having electrically actuated means therein is provided with second switch means remote from said stepping switch.

11. An electrical switching device comprising in combination a solenoid operated stepping switch, a first bank of manual switches, at least one other bank of manual switches, at least two controlled output solenoids, each of said controlled solenoids being connected to a first fixed terminal of every switch in one and separate of said banks of manual switches, a second fixed contact of each said switch in said first bank of switches being connected in parallel to the winding of said solenoid operated stepping switch, throw means in each said switch in all said banks of manual switches being contactable by a movable wiping switch terminal, said throw means in each said switch being closable alternately to fixed terminals of said switches.

References Cited by the Examiner
UNITED STATES PATENTS

| | | | |
|---|---|---|---|
| 2,178,112 | 10/39 | Barker | 317—141 |
| 2,756,818 | 7/56 | Borowski | 317—141 |
| 2,796,291 | 6/57 | Mueller | 307—39 X |
| 2,811,202 | 10/57 | Schild | 317—139 |
| 2,834,851 | 5/58 | Mastney | 317—137 |

SAMUEL BERNSTEIN, *Primary Examiner.*

LLOYD McCOLLUM, *Examiner.*